United States Patent
Jeong et al.

(10) Patent No.: US 9,557,572 B2
(45) Date of Patent: Jan. 31, 2017

(54) THREE DIMENSIONAL (3D) IMAGE DISPLAY DEVICE AND LIQUID CRYSTAL LENS PANEL THEREFOR

(71) Applicant: SAMSUNG DISPLAY CO., LTD., Yongin, Gyeonggi-Do (KR)

(72) Inventors: Seung Jun Jeong, Gyeonggi-do (KR); Soo Hee Oh, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 172 days.

(21) Appl. No.: 14/452,076

(22) Filed: Aug. 5, 2014

(65) Prior Publication Data

US 2015/0219909 A1    Aug. 6, 2015

(30) Foreign Application Priority Data

Feb. 3, 2014   (KR) .................. 10-2014-0012113

(51) Int. Cl.
*G02B 27/22* (2006.01)
*G02F 1/29* (2006.01)
*G02F 1/1345* (2006.01)
*H04N 13/04* (2006.01)

(52) U.S. Cl.
CPC ......... *G02B 27/225* (2013.01); *G02B 27/2214* (2013.01); *G02F 1/1345* (2013.01); *G02F 1/29* (2013.01); *H04N 13/0404* (2013.01); *H04N 13/0452* (2013.01)

(58) Field of Classification Search
CPC .............. G02B 27/2214; G02B 27/225; G02F 1/133526; G02F 1/29; G02F 1/1345
See application file for complete search history.

(56) References Cited

U.S. PATENT DOCUMENTS

| | | |
|---|---|---|
| 7,872,694 B2 | 1/2011 | Im |
| 7,911,548 B2 | 3/2011 | Hong et al. |
| 8,305,550 B2 | 11/2012 | Jung et al. |
| 8,305,551 B2 | 11/2012 | Son |
| 8,358,399 B2 | 1/2013 | Lee et al. |

(Continued)

FOREIGN PATENT DOCUMENTS

| | | |
|---|---|---|
| KR | 1020100075301 | 7/2010 |
| KR | 1020100075302 | 7/2010 |
| KR | 1020120074966 | 7/2012 |

OTHER PUBLICATIONS

Paul F. McManamon, et al. "A Review of Phased Array Steering for Narrow-Band Electro-Optical Systems", Proceedings of the IEEE, vol. 97, No. 6, Jun. 2009, pp. 1078-1096.

*Primary Examiner* — Dung Nguyen
(74) *Attorney, Agent, or Firm* — F. Chau & Associates, LLC

(57) ABSTRACT

An image display device includes a display panel and a liquid crystal lens. The liquid crystal lens includes first and second zones equally distant from a center of the liquid crystal lens. The first zone, positioned at a left of the center, includes first linear electrodes. The second zone, positioned at a right of the center, includes second linear electrodes. A number of the first linear electrodes is equal to a number of the second linear electrodes. Bus lines are electrically connected to the first and second linear electrodes. A number of the plurality of bus lines is less than a sum of the number of the first linear electrodes and the number of the second linear electrodes.

19 Claims, 10 Drawing Sheets

(56) References Cited

U.S. PATENT DOCUMENTS

| | | | |
|---|---|---|---|
| 9,442,298 B2 * | 9/2016 | Choi | G02B 27/2214 |
| 2012/0162550 A1 | 6/2012 | Jeong et al. | |
| 2012/0236043 A1 * | 9/2012 | Jung | G02B 27/2214 |
| | | | 349/15 |
| 2012/0300042 A1 | 11/2012 | Yun et al. | |
| 2013/0107147 A1 | 5/2013 | Whangbo et al. | |
| 2013/0107174 A1 | 5/2013 | Yun et al. | |

* cited by examiner

※ ECB-like Mode

Diffraction efficiency limitation by Fly-back generation $$\eta = \left(1 - \frac{\Lambda_F}{\Lambda}\right)^2 .$$

THREE DIMENSIONAL (3D) IMAGE DISPLAY DEVICE AND LIQUID CRYSTAL LENS PANEL THEREFOR

CROSS-REFERENCE TO RELATED APPLICATION

This application claims priority under 35 U.S.C. §119 to Korean Patent Application No. 10-2014-0012113, filed on Feb. 3, 1014 in the Korean Intellectual Property Office, the disclosure of which is incorporated by reference herein in its entirety.

TECHNICAL FIELD

The present invention relates to a 3D image display device and a liquid crystal lens panel for the 3D image display device.

DISCUSSION OF RELATED ART

Stereoscopic image displays express a stereoscopic image (referred to as "a 3D image"), using binocular disparity. Different two dimensional (2D) images are directed to a left eye and a right eye and the image directed to the left eye (hereinafter referred to as a "left eye image") and the image directed to the right eye (hereinafter referred to as a "right eye image") are recognized, in the brain, as a 3D image having depth perception or stereoscopic perception.

3D image display devices using binocular disparity include a stereoscopic-type device and an autostereoscopic-type device. In the stereoscopic-type device, glasses such as shutter glasses and polarized glasses are necessary to cause such binocular disparity. In the autostereoscopic-type device using a lenticular lens or a parallax barrier, a 3D image is provided and glasses are not necessary to see the 3D image.

SUMMARY

According to an exemplary embodiment of the present invention, an image display device is provided. The image display device includes a display panel and a liquid crystal lens positioned on the display panel. The liquid crystal lens includes a first zone and a second zone equally distant from a center of the liquid crystal lens. The first zone is positioned at a left of the center and includes a plurality of first linear electrodes. The second zone is positioned at a right of the center and includes a plurality of second linear electrodes. A number of the plurality of first linear electrodes is equal to a number of the plurality of second linear electrodes. A plurality of bus lines is electrically connected to the plurality of first linear electrodes in the first zone and the plurality of second linear electrodes in the second zone. A number of the plurality of bus lines is less than a sum of the number of the first linear electrodes and the number of the second linear electrodes.

According to an exemplary embodiment of the present invention, a liquid crystal lens panel having a liquid crystal lens and operating in a 2D mode or a 3D mode is provided. The liquid crystal lens includes a pair of liquid crystal lens regions and bus lines. One of the pair of liquid crystal lens regions is positioned in a left region of the liquid crystal lens and includes a plurality of first linear electrodes. Another of the pair of liquid crystal lens regions is positioned in a right region of the liquid crystal lens and includes a plurality of second linear electrodes. The left and right regions are equally distant from a center of the liquid crystal lens. The bus lines supply voltages to the first and second linear electrodes. At least two bus lines of the plurality of bus lines are shared by part of the plurality of first linear electrodes and part of the plurality of second linear electrodes. At least two different common voltages are supplied to the part of the first and second numbers of linear electrodes. A number of the plurality of bus lines is less than a sum of a number of the plurality of first linear electrodes and a number of the plurality of second linear electrodes.

BRIEF DESCRIPTION OF THE DRAWINGS

These and other features of the present invention will become more apparent by describing in detail exemplary embodiments thereof with reference to the accompanying drawings of which.

DETAILED DESCRIPTION OF EXEMPLARY EMBODIMENTS

Figure 1:
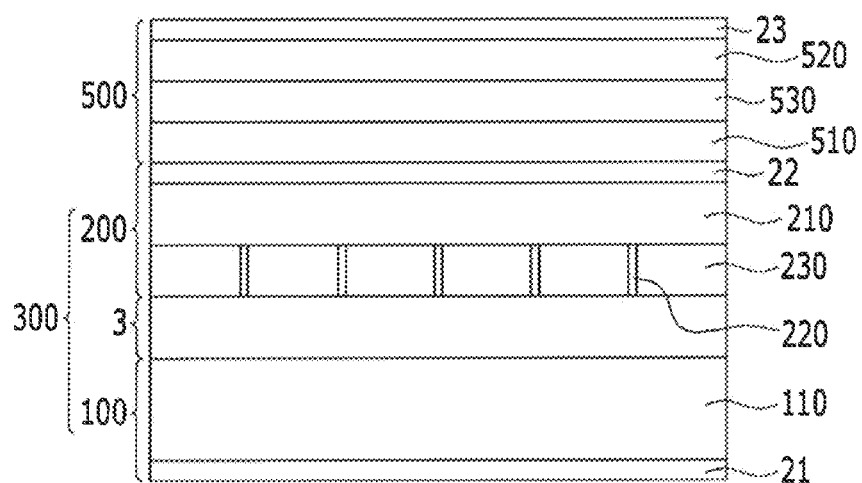
FIG. 1 is a cross-sectional view of a 3D image display device according to an exemplary embodiment of the present invention.

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being on another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

Hereinafter, a 3D image display device and a liquid crystal lens panel included therein according to an exemplary embodiment of the present invention will be described.

FIG. 1 is a cross-sectional view of a 3D image display device according to an exemplary embodiment of the present invention.

The 3D image display device includes a display panel 300 and a liquid crystal lens panel 500. The display panel 300 and the liquid crystal lens panel 500 may be operated in a 2D mode or a 3D mode.

The display panel 300 may display one plane image in the 2D mode, and alternately display images corresponding to various fields of vision such as a right eye image and a left eye image in the 3D mode in a space or time division scheme. For example, in the 3D mode, the display panel 500 may alternately display the right eye image and the left eye image for each pixel in a column.

The liquid crystal lens panel 500, in the 2D mode, transmits the image displayed on the display panel 300 as it is. The liquid crystal lens panel 500 separates the field of vision of the image displayed on the display panel 300 by forming the liquid crystal lens in the 3D mode. For example, the liquid crystal lens panel 500 operated in the 3D mode focuses a multi-view image including the left eye image and the right eye image displayed on the display panel 300 on the fields of vision corresponding to the images at each view by using diffraction and refraction of light.

The display panel 300 includes a lower panel 100 (referred to as a thin film transistor array panel), an upper panel 200 (referred to as a color filter panel), and a liquid crystal layer 3 interposed therebetween.

In the lower panel 100, a gate line transmitting a gate signal, a data line transmitting a data signal, a thin film transistor (or a switching element) connected to the gate line and the data line, and a pixel electrode connected to an output terminal of the thin film transistor are formed on a transparent insulation substrate 110 made of a material such as glass and plastic. A lower polarizer 21 is attached to a rear surface of the insulation substrate 110.

In the upper panel 200, a black matrix 220 with openings is formed in a lattice structure on an insulation substrate 210, a color filter 230 is disposed between the openings, and a common electrode is formed on the black matrix 220 and the color filter 230. An upper polarizer 22 is attached to a rear surface of the upper panel 200.

The liquid crystal layer 3 is positioned between the lower panel 100 and the upper panel 200. An alignment direction of the liquid crystal layer 3 is changed by an electric field formed between the common electrode and the pixel electrode. The present invention is not limited to a liquid crystal panel, and the display panel 300 may include a flat display panel (FDP) such as an organic light emitting panel, an electrophoretic display panel, and a plasma display panel. Also the color filter may be omitted.

The display panel 300 displays a 2D plane image, and a 3D image may be displayed using the liquid crystal lens panel 500. The 2D and 3D images are selectively displayed by controlling the operation of the liquid crystal lens panel 500 having liquid crystal lens, which may be referred to as a switchable zone plate.

The liquid crystal lens panel 500 includes a lower substrate 510, an upper substrate 520, a lens liquid crystal layer 530 positioned between the two substrates 510 and 520, and a polarizer 23 attached outside the upper substrate 520. The polarizer 23 increases display qualities by forming the characteristic of the light emitted from the 3D image display device into one polarization direction. Alternatively, the polarizer 23 may be omitted according to an exemplary embodiment.

Figure 2:
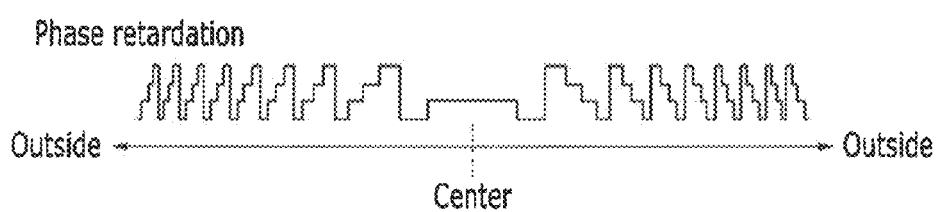
FIG. 2 is a graph of a phase retardation change according to a position of a Fresnel zone plate of a phase modulation type.

FIG. 2 is a graph showing phase retardation according to a position of a Fresnel zone plate of a phase modulation type.

Each zone of the Fresnel zone plate causes phase retardation in light passing through the zone. The phase retardation in each zone is substantially similar in shape to other zones except a zone positioned at the center. The phase retardation changes in multiple steps in each zone. For example, the zone positioned at the center generates phase retardation changes in two steps, and other zones generate phase retardation changes in three steps. The present invention is not limited thereto, and the number of steps in phase retardation changes in each zone may be varied. The Fresnel zone plate may be referred to as a multi-level phase modulation zone plate.

Using the phase retardation distribution, the Fresnel zone plate may serve as a lens. For example, the liquid crystal lens of the liquid crystal lens panel may refract light to allow the light to be collected at a focal point by using diffraction and dissipation of light that is transmitted through each zone and constructive interference. The left lens region and the right lens region may be symmetrical with reference to the center of the lens in one liquid crystal lens. Hereafter, unless otherwise specifically stated, the left region and the right region represent a left side and a right side with respect to the center of the liquid crystal lens.

Figure 3:
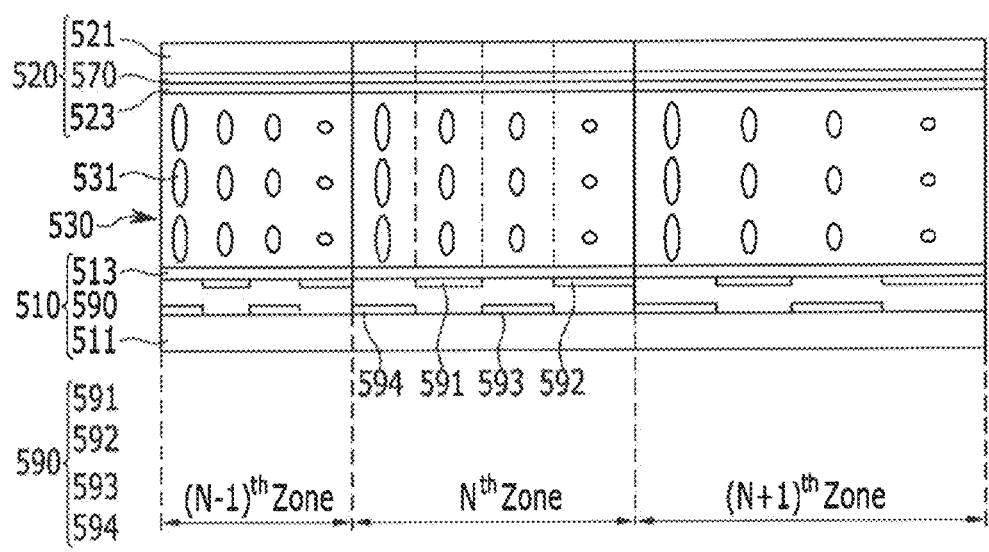
FIG. 3 is a cross-sectional view showing a layer structure of a lens region in a liquid crystal lens panel according to an exemplary embodiment of the present invention.
Figure 4:
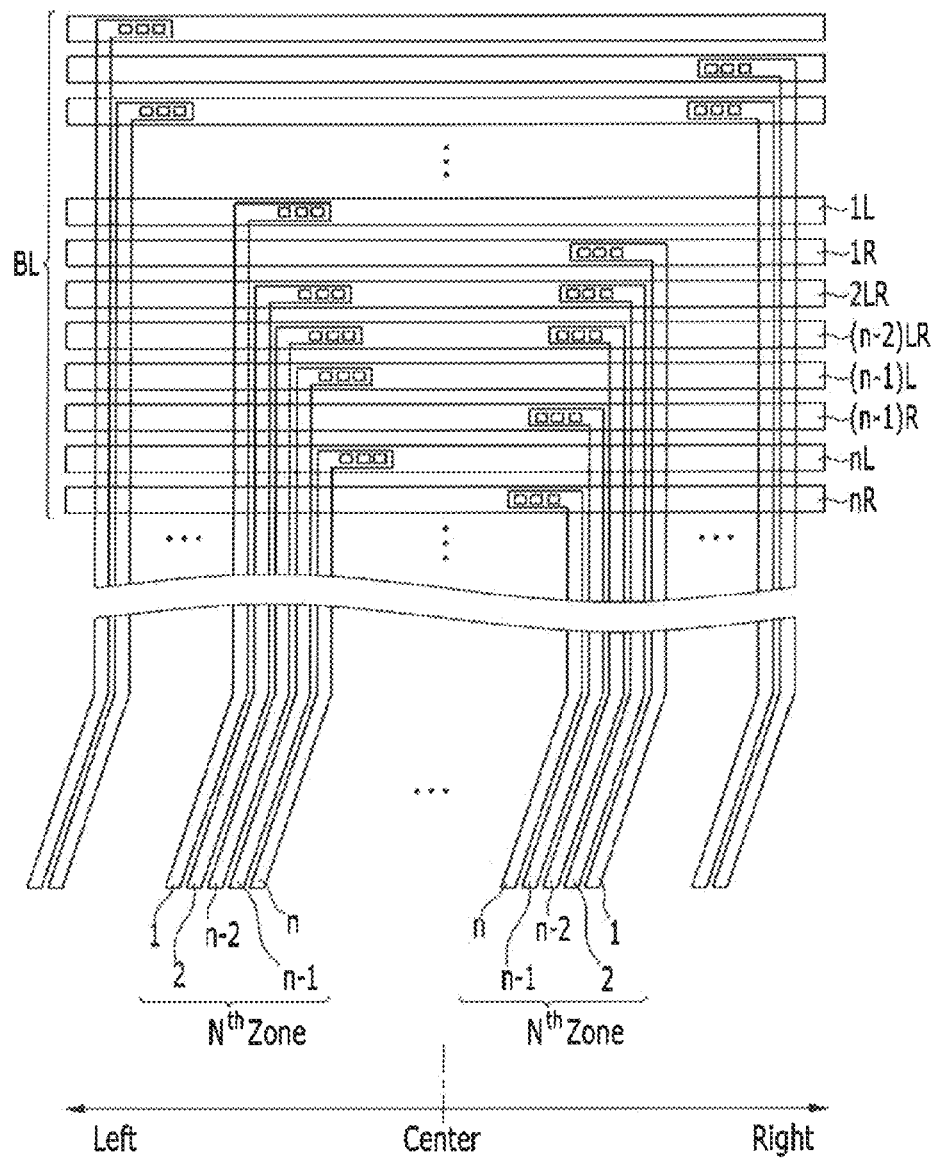
FIG. 4 is a view of a structure of a linear electrode and an outer voltage application unit in a liquid crystal lens panel according to an exemplary embodiment of the present invention.

FIG. 3 and FIG. 4 show the liquid crystal lens panel 500 according to an exemplary embodiment of the present invention.

Firstly, FIG. 3 shows a cross-sectional view showing a layer structure of the lens region of the liquid crystal lens panel according to an exemplary embodiment of the present invention.

In FIG. 3, the polarizer 23 is omitted, and a portion of one liquid crystal lens (i.e., neighboring three zones) is shown for the convenience of description. Here, the zone number is counted from a zone which is farthest away from the center of the liquid crystal lens, which is counted as a first zone. An $N^{th}$ zone (N is a natural number) corresponds to a zone positioned at the $N^{th}$ from the first zone. For example, an $(N-1)^{th}$ zone is a zone that is further away from the center of the liquid crystal lens than the $N^{th}$ zone, and an $(N+1)^{th}$ zone is a zone that is closer to the center of the liquid crystal lens than the $N^{th}$ zone.

The lower substrate 510 of the liquid crystal lens panel 500 includes a first insulation substrate 511, a linear electrode 590 positioned on the first insulation substrate 511, and a lower alignment layer 513.

The linear electrode 590 is formed of two layers, and includes lower linear electrodes 593 and 594 positioned in a lower layer and upper linear electrodes 591 and 592 positioned in an upper layer. An insulating layer formed of an inorganic insulating material or an organic insulating material is formed between the lower linear electrodes 593 and 594 and the upper linear electrodes 591 and 592 to insulate two linear electrodes 593 and 594, and 591 and 592, from each other. The linear electrode 590 may include a transparent conductive oxide (TCO) such as indium-tin oxide (ITO) and indium-zinc oxide (IZO).

The lower linear electrodes 593 and 594 and the upper linear electrodes 591 and 592 form one zone. In FIG. 3, one zone includes a total of four linear electrodes. The present invention is not limited thereto, and one zone may be formed of, for example, at least three linear electrodes. According to an exemplary embodiment, the number of linear electrodes included in each zone may be different. For example, the number of linear electrodes included in each zone may be reduced toward the outside zone from the center of the liquid crystal lens. Meanwhile, as a zone is farther away from the center of the liquid crystal lens, a width of a horizontal direction of the linear electrode included in the zone may becomes smaller.

In FIG. 3, the upper linear electrode includes the first linear electrode 591 and the second linear electrode 592 and the lower linear electrode includes the third linear electrode 593 and the fourth linear electrode 594. In one zone, the upper linear electrodes 591 and 592 and the lower linear electrodes 593 and 594 are alternately positioned.

The liquid crystal lens panel 500 may display a 2D image if no electric field is applied to the lens liquid crystal layer 530. When a predetermined electric field is applied to the lens liquid crystal layer 530, the phase retardation distribution of FIG. 3 is formed to display a 3D image. The phase retardation distribution includes multiple phase retardation steps changing between a maximum value (or largest value) and a minimum value (or smallest value) of phase retardation in light passing through the lens liquid crystal layer 530. The liquid crystal lens panel 500 includes a plurality of liquid crystal lens that are repeatedly arranged in one direction of the panel, and accordingly, each zone forming each liquid crystal lens is repeatedly arranged with a predetermined cycle. Here, one zone is defined as a region occupied by the linear electrode 590 such that the phase retardation in the zone changes from the maximum value to the minimum value. Alternatively, the phase retardation of each zone changes from the minimum value to the maximum value depending on the voltage applied to the linear electrode 590. Meanwhile, one zone may be divided with reference to a boundary such that a trend that the applied voltage is increased or decreased is changed.

In one zone, an inner zone (referred to as a sub-zone) corresponding to the region occupied by each of the linear electrodes 591, 592, 593, and 594 exists and is divided by a dotted line in FIG. 3.

A gradually increasing or decreasing voltage in one direction may be applied to the linear electrodes 590 of each zone to display a 3D image. Among the linear electrodes 590 included in one zone, the linear electrode applied with the maximum voltage may be referred to as a maximum phase formation electrode, and the electrode applied with the minimum voltage may be referred to as a minimum phase formation electrode.

The upper substrate 520 of the liquid crystal lens panel 500 includes a second insulation substrate 521, a plate electrode 570 positioned on the second insulation substrate 521, and an upper alignment layer 523.

The plate electrode 570 forms an electric field along with the linear electrode 590. For example, the plate electrode 570 is supplied with a reference voltage or a common voltage having a predetermined magnitude. The plate electrode 570 may be formed on substantially the entire region of the second insulation substrate 521.

The lens liquid crystal layer 530 is positioned between the upper substrate 520 and the lower substrate 510, and the lens liquid crystal layer 530 includes liquid crystal molecules 531.

The liquid crystal molecules 531 are initially aligned by the upper alignment layer 523 and the lower alignment layer 513, and then the arrangement direction is changed by an electric field formed between the plate electrode 570 and the linear electrode 590. The liquid crystal layer 530 in each zone has a refractive index which is controlled by the electric field applied to each zone. Light passing through the liquid crystal layer 530 is refracted, and the liquid crystal layer 530 serves as a lens. Difference in the light path of the refracted light allows different image information to be provided to two eyes of the user and the binocular disparity is generated thereby recognizing a stereoscopic effect.

The liquid crystal lens or the zone forming the liquid crystal lens is extended in the oblique arrangement direction with respect to the arrangement direction of the pixel of the matrix arrangement in the display panel 300. This is the reason that the linear electrodes 591, 592, 593, and 594 are not extended in the vertical direction but are extended in the oblique direction with a predetermined angle. If the zone or the liquid crystal lens is arranged in an oblique direction with respect to the pixel arrangement direction, a moiré pattern is prevented.

To provide the oblique zone or liquid crystal lens, the lens liquid crystal molecules 531 may be initially aligned in the oblique direction by the lower alignment layer 513. The oblique direction of the lower alignment layer 513 may be parallel to the extending direction of the linear electrode 590. Meanwhile, the upper alignment layer 523 may initially align the lens liquid crystal molecules 531 in the vertical direction. Through the oblique characteristic, a characteristic that the left lens region and the right lens region are not symmetrical with respect to the center of the lens may be generated. For example, when applying the same voltage to the linear electrodes that are symmetrical to each other in the left lens region and the right lens region, the movement of the liquid crystal molecules disposed in the lens left region and the movement of the liquid crystal molecules disposed in the lens right region may be different.

Hereafter, a relationship of the linear electrode of the liquid crystal lens disposed in the lens region and a bus line disposed in a peripheral area outside the lens region in the liquid crystal lens panel 500 will be described with reference to FIG. 4 and FIG. 5.

Figure 5:
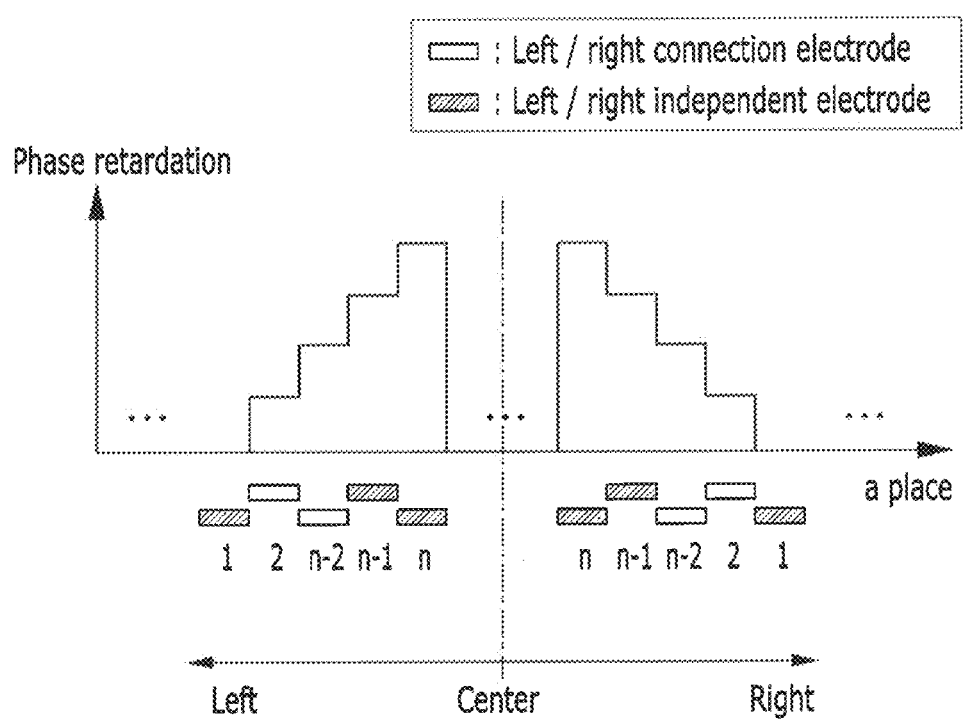
FIG. 5 is a diagram of the structure shown in FIG. 4.

FIG. 4 is a view of a structure of a linear electrode and an outer voltage application unit in a liquid crystal lens panel according to an exemplary embodiment of the present invention, and FIG. 5 is a diagram of phase retardation caused by the linear electrode structure as shown in FIG. 4.

In FIG. 4 and FIG. 5, a reference numeral for the linear electrodes disposed in each zone is indicated by 1, 2, ..., n (n is a natural number). Referring to FIG. 4, as the linear electrodes of each zone is closer to the center of the lens, the reference numeral of the linear electrodes increases from 1 to n. For example, a first electrode 1 of each zone is farthest away from the center of the lens, and an $n^{th}$ electrode n is closest to the center of the lens.

Referring to FIG. 4, the linear electrodes (1, 2, ..., n) included in one zone of one liquid crystal lens are electrically connected to bus lines BL disposed in a horizontal direction outside the panel through at least one contact hole. Here, the linear electrodes indicated by the reference numeral represent the linear electrodes included in the zone where the left lens region and the right lens region are symmetrical to each other with respect to the center of the liquid crystal lens. For example, the linear electrodes (1, 2, ..., n) positioned in the left lens region are the linear electrodes included in the $N^{th}$ zone from the left end of the lens, and the linear electrode (1, 2, ..., n) positioned in the right lens region are the linear electrodes included in the $N^{th}$ from the right end of the lens.

For the convenience of description, the linear electrodes of a pair of the $N^{th}$ zones are shown in FIG. 4. Such symmetric connection line relationship of the $N^{th}$ zones may be applied for the linear electrodes of other pairs. The number of linear electrodes in each zone may be varied depending on the position of the zone. For example, the $N^{th}$ zone may include 8 linear electrodes and the $(N+1)^{th}$ zone may include 9 linear electrodes, and in this case, n is 8 for the $N^{th}$ zone, and n is 9 for the $(N+1)^{th}$ zone.

The bus line BL is connected to a driving circuit (not shown) to receive a driving voltage to be applied to the linear electrode. Accordingly, the output voltage of the driving circuit is applied to the linear electrode of each liquid crystal lens through the bus line BL. Each bus line BL may be applied with voltages of different levels from the driving circuit.

Each bus line is substantially disposed to be parallel to the adjacent bus line. The bus lines BL may be disposed to enclose the lens region in which the liquid crystal lens is formed or may only be disposed at an upper outer region or a lower outer region of the lens region. For example, in a case of a large sized liquid crystal lens panel, the bus lines BL may all be disposed in the upper region and the lower region. The number of bus lines BL may be several tens to several hundreds according to an exemplary embodiment.

The bus lines BL may be formed of a metal such as titanium (Ti), copper (Cu), molybdenum (Mo), aluminum (Al), tungsten (W), or an alloy thereof. The bus line BL may be formed of a single layer or a dual layer (e.g., Ti/Cu).

The linear electrodes (1, 2, . . . , n) extend in the oblique direction so that the zone or the liquid crystal lens extends in the oblique direction. The portion that extends in the oblique direction is the lens region where the liquid crystal lens is positioned, and corresponds to the display area of the display panel 300. However, they may extend in the vertical direction in the peripheral area outside the lens region, and are connected to the bus lines 1L, 1R, 2LR, n-2LR, n-1R rd and nR to apply the voltage to each linear electrode. Accordingly, the linear electrodes (1, 2, . . . , n) receive the voltage output from the driving circuit through the bus lines 1L, 1R, 2LR, n-2LR, n-1L, n-1R, and nR.

For the linear electrodes that are symmetrical to each other disposed in a pair of zones that are symmetrical to each other with respect to the center of the lens, the first linear electrode 1 of the left zone and the first linear electrode 1 of the right zone are connected to the different bus lines 1L and 1R. Also, the $(n-1)^{th}$ linear electrode n-1 of the left zone and the $(n-1)^{th}$ linear electrode n-1 of the right zone are connected to the different bus lines $(n-1)L$ and $(n-1)R$, and the $n^{th}$ linear electrode n of the left zone and the $n^{th}$ linear electrode n of the right zone are connected to the different bus lines nL and nR. As a result, among the linear electrodes of the left zone and the right zone that are symmetrical to each other, the first, $(n-1)_{th}$, and $n_{th}$ linear electrodes may be applied with different voltages. The other linear electrodes 2 and n-2 of the left and right zones that are symmetrical to each other are connected to the same bus lines 2LR and (n-2)LR, respectively. Accordingly, the linear electrodes n and n-2 are applied with the same voltage for the linear electrodes that are symmetrical to each other.

The first, $(n-1)^{th}$, and $n^{th}$ linear electrodes 1, (n-1) and n may be referred to as right/left independent electrodes, and the other linear electrodes 2 and n-2 may be referred to as right/left connection electrodes. Among the left/right independent electrodes 1, (n-1) and n, the first linear electrode 1 is a linear electrode corresponding to the minimum refractive index region of each zone, and the $(n-1)^{th}$ and the $n^{th}$ linear electrodes are linear electrodes corresponding to the phase modulation region. This will be described later.

According to the above connection rule, compared with the case connecting each linear electrode to the different bus line to independently apply the voltage for all linear electrodes that are symmetrically positioned, the number of the bus lines may be reduced. For example, when each zone includes i linear electrodes that are four or more, the (i-3) linear electrodes of the left zone and the (i-3) linear electrodes of the right zone that are symmetrical to each other are connected to the same bus lines for the linear electrodes that are symmetrical to each other and thereby the (i-3) bus lines may be reduced for each zone compared with the case that the different bus line is connected for each linear electrode. As shown in FIG. 4, for example, if the number of the linear electrodes included in each zone is 5, two bus lines may be eliminated compared with the case that one bus line is connected to each linear electrode. As the number of linear electrodes included in each zone is increased, the number of bus lines that can be reduced is further increased.

However, although the rest of the linear electrodes except for the right/left independent electrodes are connected for the linear electrodes that are symmetrical (i.e., they are connected to the same bus line and receive the same voltage), performance of the liquid crystal lens such as diffraction efficiency may be almost equally maintained.

Hereinafter, the reason why the left/right independent voltage is applied for the first, $(n-1)^{th}$, and $n^{th}$ left/right symmetry linear electrodes and the same voltage is applied through the right/left connection for the rest of the symmetry linear electrodes will be described in detail.

FIG. 6 to FIG. 9 are views showing a characteristic of a phase modulation region according to an exemplary embodiment of the present invention.

Figure 6:
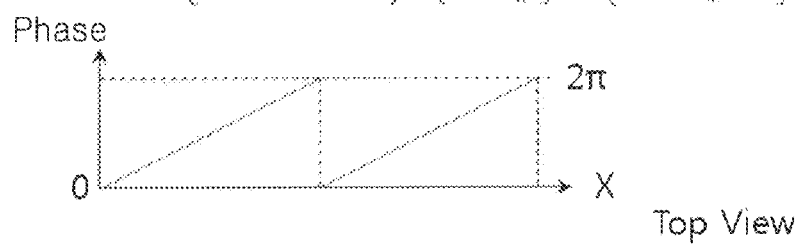
FIG. 6 to FIG. 9 are views showing a characteristic of a phase modulation region according to an exemplary embodiment of the present invention.
Figure 6:
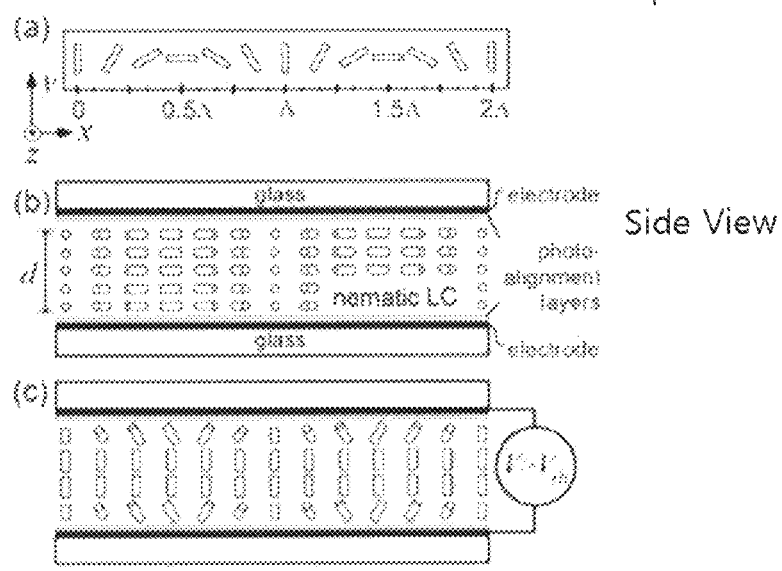

In FIG. 6, a characteristic of a quarter wave plate/half wave plate/quarter wave plate (QHQ) region corresponding to the phase modulation region is described. The QHQ region has a structure in which a quarter phase difference plate (a quarter wave plate), a half phase difference plate (a half wave plate), and a quarter phase difference plate (a quarter wave plate) are stacked on each other. The QHQ region of FIG. 6 has a characteristic that the liquid crystal molecule arrangement is sequentially formed, differently from an electrically controlled birefringence (ECB)-like mode of FIG. 7. The concept of the QHQ region and the ECB-like mode are described in "A review of phased array steering for narrow-band electro-optical system", Paul F. McManamon, et al., IEEE 2009, which is incorporated by reference herein in its entirety.

Figure 8:
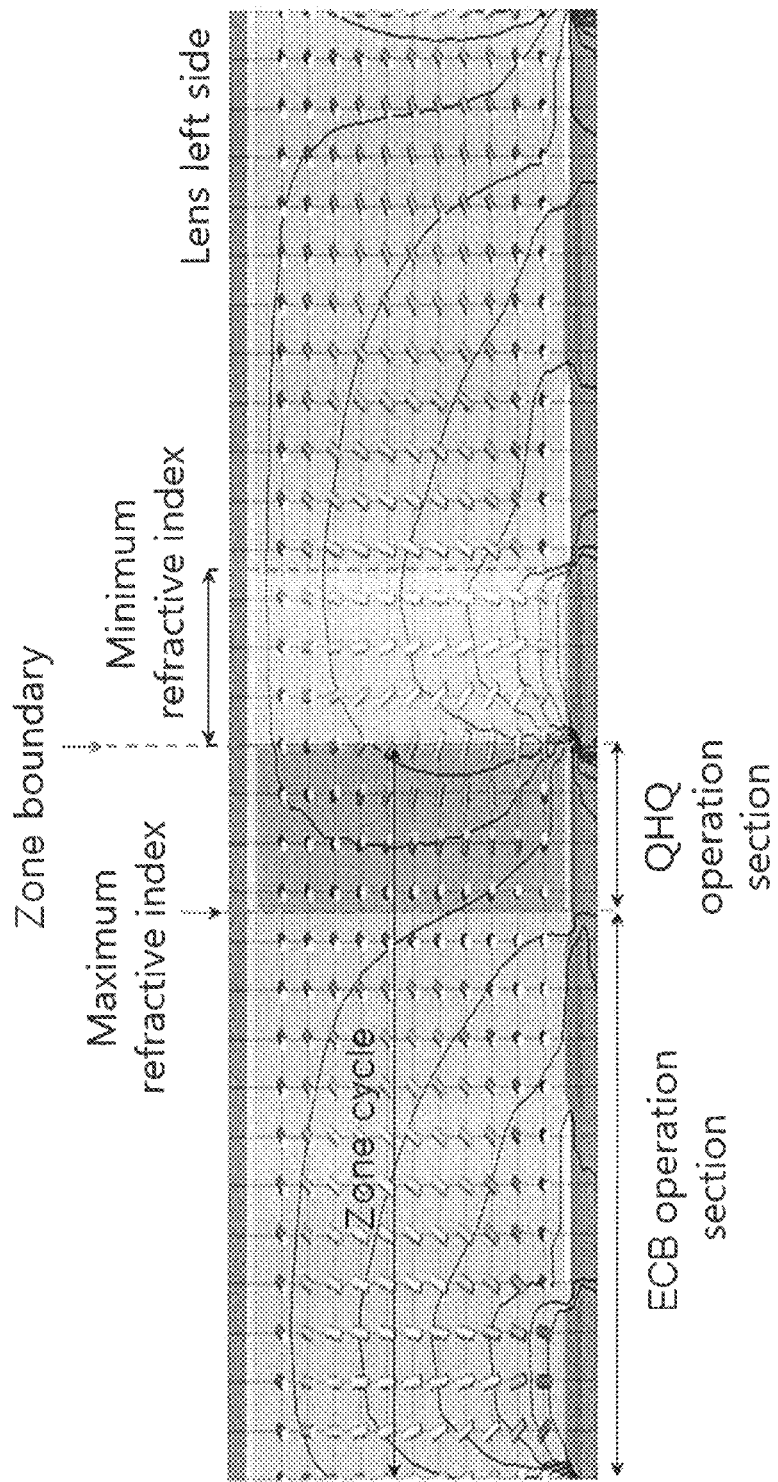
Figure 9:
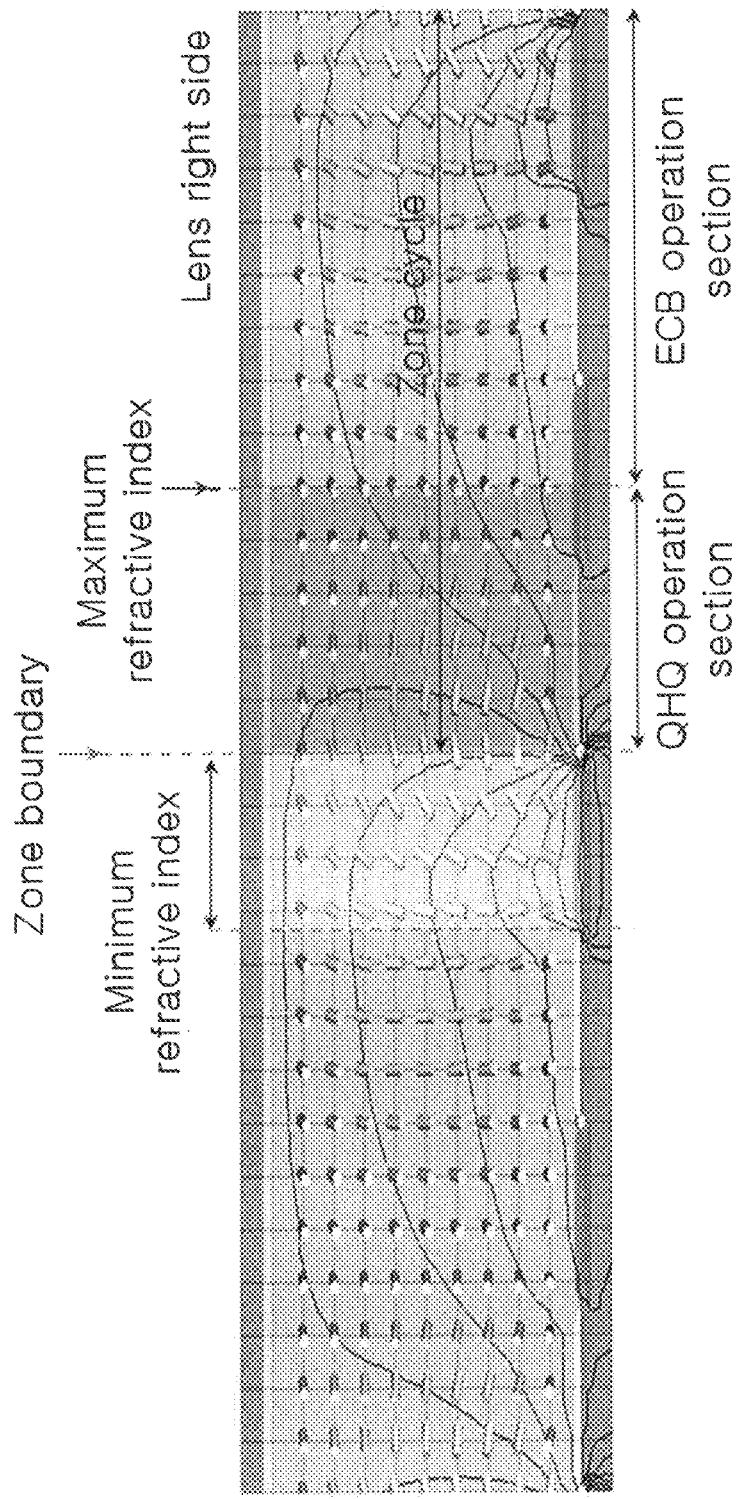

FIG. 8 and FIG. 9 show a position of the phase modulation region corresponding to the QHQ region and an operation characteristic according to an exemplary embodiment of the present invention. FIG. 8 corresponds to the left region of the liquid crystal lens and FIG. 9 corresponds to the right region. FIG. 8 and FIG. 9 show two adjacent zones, and each zone includes the 4 linear electrodes.

The arrangement of liquid crystal molecules and equipotential lines are shown according to an electric field applied to the liquid crystal molecules. Also, a zone boundary and a position of maximum refractive index are shown, and a minimum refractive index region is shown. The region between the position of the maximum refractive index and the zone boundary may be referred to as a phase modulation region. In the phase modulation region, the refractive index is sequentially changed from the minimum refractive index region to the maximum refractive index in an $N^{th}$ zone. A heterogeneous refractive index change characteristic is generated from the maximum refractive index position to the boundary of the next zone. The phase modulation region may be generated while the liquid crystal is rotated in one plane (an in-plane rotation) and may have the characteristic of the QHQ region of FIG. 7 and FIG. 8.

In the case that the initial alignment of the liquid crystal molecule is not symmetrical between the left region and the right region of the liquid crystal lens, and that the phase modulation region is formed of the QHQ region, the same voltage applied to the linear electrodes that are symmetrical to each other causes asymmetry in an amount of the in-plane rotation and a magnitude of the phase modulation region between the left region and the right region. Accordingly, to increase the efficiency of the liquid crystal lens, to change the asymmetric characteristic into symmetry, it is necessary to apply the different voltage to the left/right linear electrode corresponding to the phase modulation region. According to an exemplary embodiment of the present invention, among the linear electrodes that are symmetrical to each other and disposed in a pair of zones that are symmetrical to each other with respect to the center of the liquid crystal lens, the linear electrodes (the $(n-1)^{th}$ and $n^{th}$ linear electrodes) corresponding to the phase modulation region are connected to the different bus lines, thereby receiving the different voltages.

The magnitude of the phase modulation region is only related to the $n^{th}$ linear electrode (the linear electrode positioned at the first-left side of the zone boundary with reference to the zone boundary) in the left region. However, in the right region, the $(n-1)^{th}$ linear electrode along with the linear electrode are related (they are the linear electrodes positioned at the first and second right sides of the zone boundary with reference to the zone boundary). For example, the $n^{th}$ electrode, and at least a portion of the $(n-1)^{th}$ linear electrode are included in the phase modulation region. This is because the liquid crystal molecules are differently moved in the left region and the right region in response to the electric field from the initial alignment state by the alignment layer (e.g., the liquid crystal molecules are rotated in a clockwise direction in the left phase modulation region of the lens and are rotated in a counterclockwise direction in the right phase modulation region of the lens). According to the initial alignment direction of the liquid crystal molecules, the QHQ region of the zone may be reversed to be shown in the left region and the right region.

In the left lens region and the right lens region, the minimum refractive index region is the region corresponding to the first linear electrode (with reference to the zone boundary, the linear electrode positioned at the right-first of the zone boundary in the left lens region and the linear electrode lens positioned at the left-first region of the zone boundary in the right region) of each zone. The maximum voltage is applied to the first linear electrode forming the minimum refractive index region in each zone. Accordingly, the influence of the electric field by the voltage applied to the first linear electrode affects the phase modulation region adjacent to the first linear electrode such that it is necessary to apply the right/left different voltages for the linear electrodes corresponding to the minimum refractive index region. According to an exemplary embodiment of the present invention, among the linear electrodes that are symmetrical to each other and disposed in a pair of zones that are symmetrical to each other with reference to the center of the liquid crystal lens, the linear electrodes (the first linear electrodes) corresponding to the minimum refractive index region are connected to the different bus lines, thereby receiving the different voltages.

Figure 7:
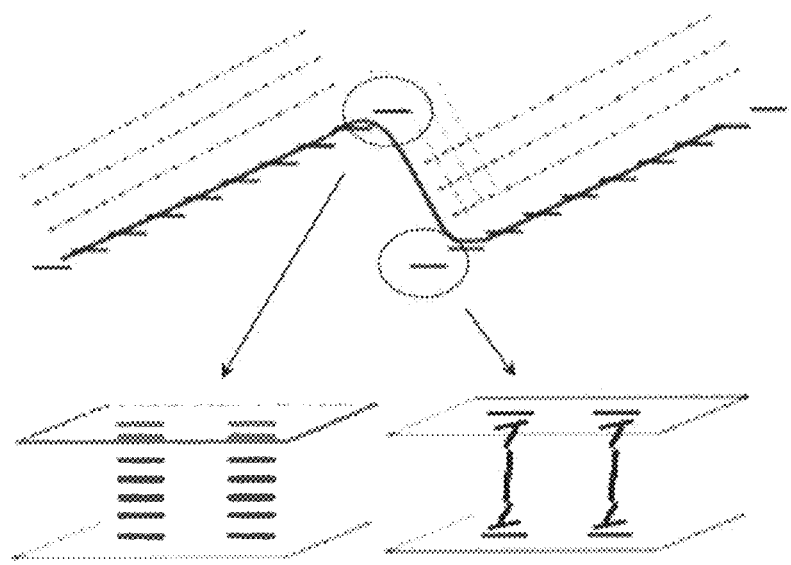

In each zone, the linear electrodes corresponding to the phase modulation region and the minimum refractive index region, that is, the linear electrodes between the minimum refractive index region and the maximum refractive index position, generate the phase retardation by the movement of the liquid crystal molecules according to the ECB-like mode shown in FIG. 7. Accordingly, the arrangement of the liquid crystal molecules is not mirror symmetry, but is rotated in the same direction such that the linear electrodes that are right-left symmetrical to each other with reference to the center of the liquid crystal lens may be applied with the same voltage.

Figure 10:
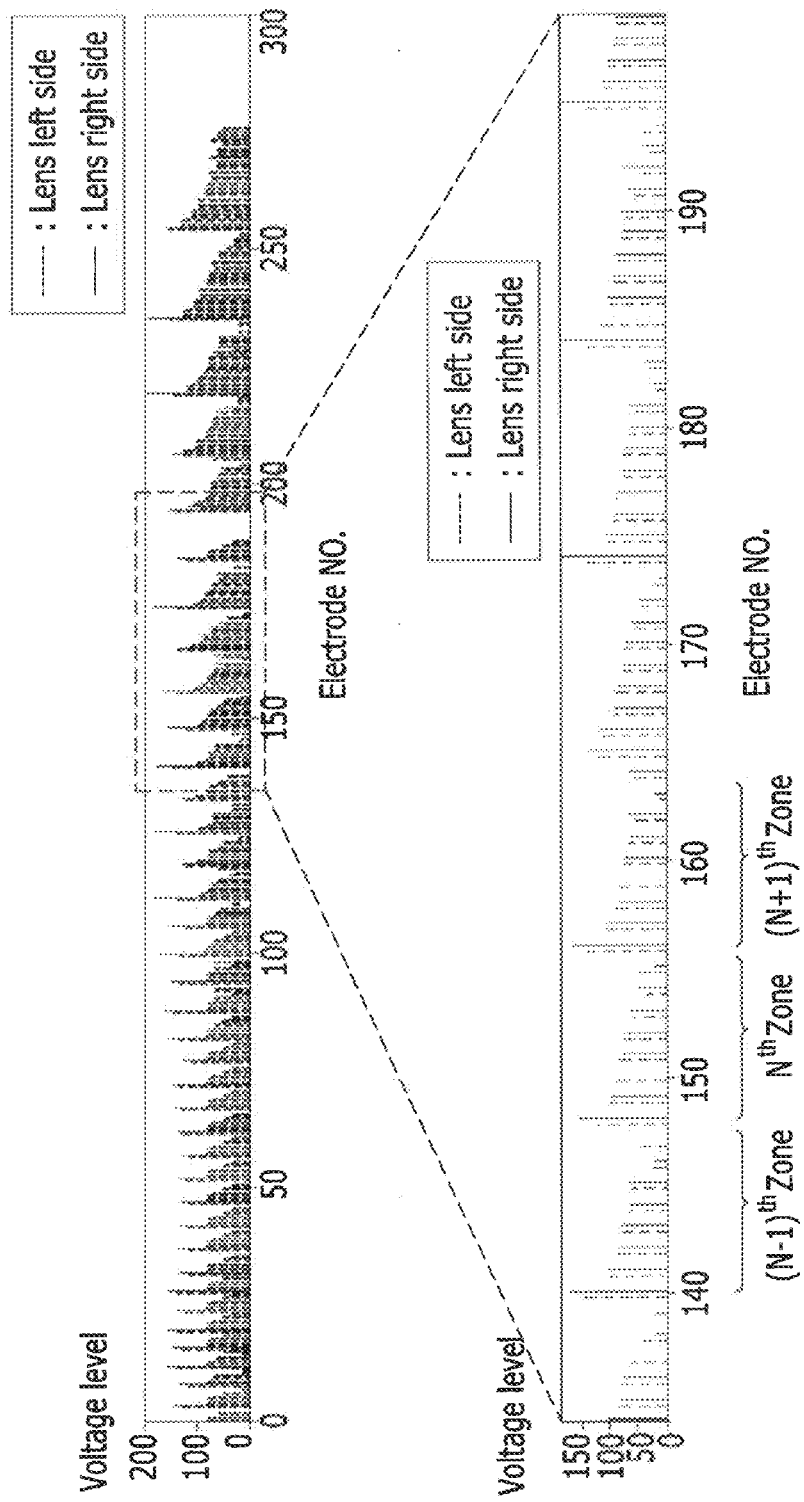
FIG. 10 is a graph of an optimized driving voltage of a left region and a right region in a liquid crystal lens in which all linear electrodes are independently driven.

FIG. 10 is a graph of an optimized driving voltage of a left region and a right region in a liquid crystal lens in which all linear electrodes are independently driven.

FIG. 10 shows the voltages applied to the linear electrodes that are right-left symmetrical to each other with reference to the center of the liquid crystal lens in the optimized driving voltage of the liquid crystal lens in a pair. In the graph, a horizontal axis represents a number of linear electrodes, wherein the number of linear electrodes positioned farthest away from the center of the liquid crystal lens is 1 and the number thereof is increased coming closer to the center of the liquid crystal lens. For example, in the partially enlarged graph, the voltage corresponding to the number 140 of the electrodes displays the voltage (indicated by a dotted line) applied to the linear electrode positioned at the $140^{th}$ from the left end of the lens and the voltage (indicated by a solid line) positioned at the $140^{th}$ from the right end of the lens.

Referring to the graph of FIG. 10, as the linear electrode is closer to the center of the liquid crystal lens, an increase/decrease of the voltage level is repeated. At this time, the linear electrode in which the voltage is largely increased compared with the voltage of the previously linear electrode corresponds to the first linear electrode of one zone that is explained related to FIG. 4 and FIG. 5, and the previous electrode corresponds to the $n^{th}$ linear electrode of the adjacent zone. For example, one zone (hereinafter, the $(N-1)^{th}$ zone) is formed from the $140^{th}$ linear electrode to the $147^{th}$ linear electrode, and the other one zone (hereinafter, the $N^{th}$ zone) is formed from the $148^{th}$ linear electrode to the $155^{th}$ linear electrode. The $140^{th}$ linear electrode corresponds to the first linear electrode applied with the maximum voltage in the $(N-1)^{th}$ zone, and the $148^{th}$ linear electrode corresponds to the first linear electrode applied with the maximum voltage in the $N^{th}$ zone. The $147^{th}$ linear electrode corresponds to the $n^{th}$ linear electrode of the $(N-1)^{th}$ zone, and the $155^{th}$ linear electrode corresponds to the $n^{th}$ linear electrode of the $N^{th}$ zone. Also, the $146^{th}$ linear electrode corresponds to the $(n-1)^{th}$ linear electrode of the $(N-1)^{th}$ zone, and the $154^{th}$ linear electrode corresponds to the $(n-1)^{th}$ linear electrode of the $N^{th}$ zone.

In each zone, when comparing the magnitude of the optimized driving voltage between the linear electrodes forming the right-left symmetry of the liquid crystal lens, the first, $(n-1)^{th}$, and the $n^{th}$ linear electrodes have some difference of the driving voltage for the left and right linear electrodes, and the other linear electrodes have little difference of the optimized driving voltage for the left and right linear electrodes. Accordingly, although the linear electrodes that have the little difference of the optimized driving voltage between the left and right linear electrodes are connected to the same bus line to be applied with the same voltage, compared with a case of independently applying the voltage to all linear electrodes, the number of bus lines may be reduced while equally maintaining the diffraction efficiency of the liquid crystal lens. In other words, three linear electrodes per each zone are right/left independently driven and the rest of the linear electrodes are driven with the right/left connection, and as a result, while maintaining the performance of the liquid crystal lens, the number of bus lines may be reduced by the number of the linear electrodes that are driven with the right/left connection.

While the present invention has been shown and described with reference to exemplary embodiments thereof, it will be apparent to those of ordinary skill in the art that various changes in form and detail may be made therein without departing from the spirit and scope of the inventive concept as defined by the following claims.

What is claimed is:
1. An image display device comprising:
 a display panel;
 a liquid crystal lens positioned on the display panel, wherein the liquid crystal lens includes a first zone and a second zone, wherein the first zone is positioned at a left of a center and includes a plurality of first linear electrodes, wherein the second zone is positioned at a right of the center and includes a plurality of second linear electrodes, wherein a number of the plurality of first linear electrodes is equal to a number of the plurality of second linear electrodes; and a plurality of bus lines electrically connected to the plurality of first linear electrodes in the first zone and the plurality of second linear electrodes in the second zone, wherein a number of the plurality of bus lines is less than a sum of the number of the first linear electrodes and the number of the second linear electrodes, wherein the plurality of bus lines is formed of a first group of bus lines, a second group of bus lines and a third group of bus lines, wherein each bus line in the first group of bus lines is electrically connected to a first corresponding linear electrode of the plurality of first linear electrodes only, wherein each bus line in the second group of bus lines is electrically connected to a second corresponding linear electrode of the plurality of second linear electrodes only, and wherein each bus line in the third group of bus lines is electrically commonly connected to a corresponding pair of electrodes of the plurality of first and second linear electrodes.

2. The image display device of claim 1, wherein the third group of bus lines is interposed between the first group of bus lines and the second group of bus lines.

3. The image display device of claim 1, wherein the first corresponding linear electrode includes at least two electrodes adjacent to a left of a first zone boundary and at least one electrode adjacent to a right of a second zone boundary, wherein one of the corresponding pair of electrodes in the plurality of first linear electrodes is interposed between the at least two electrodes and the at least one electrode, wherein the first and second zone boundaries define the first zone, and wherein the first zone boundary is closer to the center of the liquid crystal lens than the second zone boundary.

4. The 3D image display device of claim 3, wherein the first zone further includes a single plate electrode and a liquid crystal layer interposed between the single plate electrode and the plurality of first linear electrodes, wherein a maximum refractive index of the first zone is located between an electrically controlled birefringence (ECB) operation section and a quarter wave plate/half wave plate/quarter wave plate (QHQ) operation section of the first zone.

5. The image display device of claim 4, further comprising a third zone adjacent to a right of the first zone, wherein the third zone is closer to the center of the liquid crystal lens, wherein the QHQ operation section of the first zone is adjacent to a minimum refractive index section of the third zone, and wherein the first zone boundary of the first zone is positioned between the QHQ operation section of the first zone and the minimum refractive index section of the third zone.

6. The image display device of claim 5, wherein the first zone further includes a minimum refractive index section adjacent to the second zone boundary, and wherein the ECB operation section of the first zone is interposed between the minimum refractive index section of the first zone and the QHQ operation section of the first zone.

7. The image display device of claim 6, wherein the QHQ operation section and the minimum refractive index section of the first zone are controlled by voltages supplied by the first and second groups of bus lines, and wherein the ECB operation section of the first zone is controlled by voltages supplied by the third group of bus lines.

8. The image display device of claim 1, wherein a decreasing voltage is applied to the plurality of first linear electrodes in the first zone using the plurality of bus lines, wherein a minimum voltage of the decreasing voltage is applied to a linear electrode farthest away from the center of the liquid crystal lens, and wherein a maximum voltage of the decreasing voltage is applied to a linear electrode closest to the center.

9. The image display device of claim 1, wherein the plurality of first linear electrodes in the first zone includes upper linear electrodes and lower linear electrodes positioned in different layers.

10. The image display device of claim 9, wherein the plurality of first linear electrodes in the first zone includes at least three linear electrodes.

11. The image display device of claim 1, wherein the plurality of bus lines is substantially parallel to each other.

12. The image display device of claim 11, wherein the plurality of bus lines receives voltages of different levels from a driving circuit.

13. The image display device of claim 1, wherein at least part of the linear electrode closest to the center of the liquid crystal lens is position in the QHQ operation section.

14. The image display device of claim 1, wherein the first and second numbers of linear electrodes are extend in an oblique direction with respect to an extending direction of the plurality of bus lines.

15. A liquid crystal lens panel having a liquid crystal lens and operating in a 2D mode or a 3D mode, the liquid crystal lens comprising:

a pair of liquid crystal lens regions, wherein one of the pair of liquid crystal lens regions is positioned in a left region of the liquid crystal lens and includes a plurality of first linear electrodes, and another of the pair of liquid crystal lens regions is positioned in a right region of the liquid crystal lens and includes a plurality of second linear electrodes; and a plurality of bus lines configured to supply voltages to the pluralities of first and second linear electrodes, wherein at least two bus lines of the plurality of bus lines are shared by part of the plurality of first linear electrodes and part of the plurality of second linear electrodes, thereby at least two different common voltages being supplied to the part of the first and second numbers of linear electrodes, wherein a number of the plurality of bus lines is less than a sum of a number of the plurality of first linear electrodes and a number of the plurality of second linear electrodes, and wherein each of linear electrodes other than the part of the first and second numbers of linear electrodes is independently applied with a voltage from a corresponding bus line other than the at least two bus lines.

16. The liquid crystal lens panel of claim 15, further comprising:

a peripheral area outside the pair of liquid crystal lens region, wherein the plurality of bus lines is disposed on the peripheral area.

17. The liquid crystal lens panel of claim 15, wherein the plurality of first linear electrodes is positioned in different layers.

18. The liquid crystal lens panel of claim 15, wherein the plurality of first linear electrodes includes at least three linear electrodes.

19. The liquid crystal lens panel of claim 15, wherein the plurality of first linear electrodes is extended in an oblique direction with respect to an extending direction of the plurality of bus lines.

* * * * *